(12) United States Patent
Arich de Finetti (10) Patent No.: US 7,985,812 B2
(45) Date of Patent: Jul. 26, 2011

(54) METHOD FOR CONTROLLING A SOLUTION PROCESS FOR THE POLYMERIZATION OF OLEFINS

(75) Inventor: Nicolo' Arich de Finetti, Ferrara (IT)

(73) Assignee: Basell Pollolefine Italia s.r.l., Milan (IT)

( * ) Notice: Subject to any disclaimer, the term of this patent is extended or adjusted under 35 U.S.C. 154(b) by 0 days.

(21) Appl. No.: 12/734,406

(22) PCT Filed: Oct. 20, 2008

(86) PCT No.: PCT/EP2008/064087
§ 371 (c)(1),
(2), (4) Date: Apr. 29, 2010

(87) PCT Pub. No.: WO2009/056461
PCT Pub. Date: May 7, 2009

(65) Prior Publication Data
US 2010/0311921 A1 Dec. 9, 2010

Related U.S. Application Data

(60) Provisional application No. 61/001,343, filed on Nov. 1, 2007.

(30) Foreign Application Priority Data

Oct. 31, 2007 (EP) .................................. 07119703

(51) Int. Cl.
*C08F 2/04* (2006.01)
*C08F 210/16* (2006.01)

(52) U.S. Cl. ................ 526/61; 526/59; 700/269; 702/30

(58) Field of Classification Search .................... 526/59, 526/61, 68; 700/269; 702/30
See application file for complete search history.

(56) References Cited

U.S. PATENT DOCUMENTS

| 3,565,873 | A | 2/1971 | Sutherland, Jr. et al. |
| 5,151,474 | A * | 9/1992 | Lange et al. ................ 526/60 |
| 2004/0015267 | A1 | 1/2004 | Sait et al. |
| 2007/0019191 | A1 | 1/2007 | Marrow et al. |

FOREIGN PATENT DOCUMENTS
WO    WO-96/41822    12/1996

OTHER PUBLICATIONS

Gross et al., "Perturbed-Chain SAFT: An Equation of State Based on a Perturbation Theory for Chain Molecules," *Ind.Eng.Chem.Res.* 2001, 40, 1244-1260.
Gross et al., "Modeling Polymer Systems Using the Perturbed-Chain Statistical Associating Fluid Theory Equation of State," *Ind.Eng. Chem.Res.* 2002, 41, 1084-1093.

(Continued)

*Primary Examiner* — Fred M Teskin
(74) *Attorney, Agent, or Firm* — Dilworth IP LLC (57) ABSTRACT

A method for controlling a solution process for the polymerisation of olefins is disclosed. The method is based on an algorithm that calculates predicted operating parameters of the process, including calculation of the extent of reaction ($\xi$), as a function of the solution density ($\rho$), and then calculation of the whole composition of the solution. The algorithm resolves a system of equations comprising the equation of state in the PC-SAFT form, the Lewis-Mayo equation for monomer incorporation into a copolymer, and the stoichiometry equation. Predicted parameters are compared to target parameters to detect possible deviations and implement corresponding compensation in the feed.

12 Claims, 1 Drawing Sheet

OTHER PUBLICATIONS

Kouskoumvekaki et al., "Novel Method for Estimating Pure-Component Parameters for Polymers: Application to the PC-SAFT Equation of State," *Ind.Eng.Chem.Res.* 2004, 43, 2830-2838.

Richards et al., "Measurement and control of polymerization reactors," *Computers & Chemical Engineering* 2006, 30, 1447-1463.

\* cited by examiner

METHOD FOR CONTROLLING A SOLUTION PROCESS FOR THE POLYMERIZATION OF OLEFINS

This application is the U.S. national phase of International Application PCT/EP2008/064087, filed Oct. 20, 2008, claiming priority to European Patent Application 07119703.2 filed Oct. 31, 2007, and the benefit under 35 U.S.C. 119(e) of U.S. Provisional Application No. 61/001,343, filed Nov. 1, 2007; the disclosures of International Application PCT/EP2008/064087, European Patent Application 07119703.2 and U.S. Provisional Application No. 61/001,343, each as filed, are incorporated herein by reference.

The present invention relates to a method for controlling a solution process for the polymerisation of olefins. In particular, the invention relates to a method for controlling a process to produce olefin copolymers carried out in the presence of a solvent.

The production of olefin copolymers is carried out by a variety of processes, including gas-phase, slurry and solution polymerisation processes.

Solution processes are characterised by the use of a suitable solvent in which the (co)polymer formed by the polymerisation reaction is continuously dissolved. In some cases the solvent is the monomer itself, for example when polybutene is formed by polymerising liquid butene-1. In other cases the solvent is a hydrocarbon other than the monomer(s), as in case of production of ethylene-propylene rubbers (EPR or EPDM).

In the production of solid polymers by continuously polymerising olefin monomers in solution it is desirable to control the polymerisation reaction so as to provide polymers having constant and target physical properties. Any deviation from a set of conditions known to produce the desired product would inevitably result in a large amount of off-specification product.

US 2007/0019191 A1 discloses a method of monitoring a solution polymerisation process using Raman spectroscopy to determine various properties of the reaction mixture. One or more Raman probes are inserted in the polymerisation reactor, in the discharge line and/or in a sampling apparatus designed to continuously extract a stream of polymerisation material. Compositional values and a variety of characterisation values may be determined, which are then compared via a processor with baseline data to ensure that the polymerisation material of the polymerisation system is within acceptable operating specifications.

In the method disclosed in the document above, however, sampling and analysing devices and special care are required to implement successfully the Raman spectroscopy monitoring technique. The sampling apparatus may need a pump to ensure a continuous flow of material from the reactor, and the temperature surrounding the probe is to be accurately controlled to compensate for the shift in the scattered radiation. Also, it may be necessary to compensate for signal interference (noise), so that implementation of the method is rather expensive.

Thus, the need is felt for a method for controlling a solution process for the polymerisation of olefins which is reliable, simple, and does not require use of special apparatuses to analyse and determine characteristics of the polymerisation mixture or of the (co)polymer produced.

SUMMARY OF THE INVENTION

Therefore the present invention relates to a method for controlling a solution process for the polymerisation of olefins in which one or more monomers are polymerised in a reactor to form a polymer which is soluble in a solvent present in the reactor, said process comprising recycling unreacted monomers and solvent and feeding fresh monomers and solvent in said reactor;

said method being characterised by comprising the following steps:
   a) measuring the values of a set of operating parameters, including:
      (i) temperature (T) of the polymerisation reactor
      (ii) pressure (P) of the polymerisation reactor,
      (iii) density ($\rho$) of the solution within the polymerisation reactor;
      (iv) flow rate of the recycle stream;
      (v) concentration of monomers in the recycle stream;
      (vi) concentration of solvent in the recycle stream;
      (vii) flow rate of the fresh monomers fed to the polymerisation reactor;
   b) using the values of said operating parameters to calculate a set of predicted parameters related to the stream discharged from the polymerisation reactor; including:
      (i) flow rate of unreacted monomers;
      (ii) flow rate of discharged solvent;
      (iii) flow rate of discharged polymer;
   c) comparing said values of said predicted parameters to target parameters defined for optimum operation of the process to produce a polymer with desired characteristics and properties;
   d) detecting possible deviations of the value of said predicted parameters from the values of the corresponding target parameters;
   e) optionally adjusting the flow rate of one or more of said monomers freshly fed to said polymerisation reactor, and/or of any other component of the stream fed to said reactor, and/or adjusting the temperature (T) and/or the pressure (P) of said polymerisation reactor to compensate for said possible deviations;
wherein said calculation of said predicted parameters is carried out by an algorithm performing a calculation of the extent of reaction ($\xi$) as a function of the solution density ($\rho$) and then calculating the whole composition of the solution, said calculation comprising resolution of a system of equations comprising an equation of state, equations for the relative incorporation of the monomers into the copolymer, stoichiometric equations and transformation equations.

DETAILED DESCRIPTION OF THE INVENTION

The process control method according to the present invention is applicable to solution processes for the polymerisation of olefins, particularly to solution processes to produce copolymers from two or more comonomers carried out in the presence of a solvent for the copolymer product.

Figure 1:
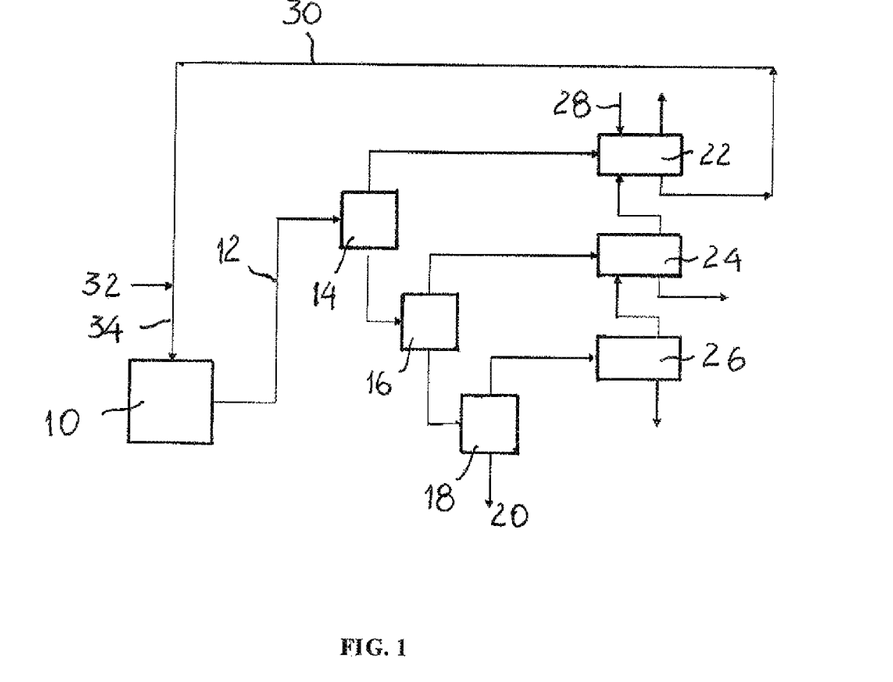
FIG. 1 illustrates a process flow diagram for a $C_2/C_3$ copolymerization process.

An embodiment of a flow diagram for an ethylene-propylene copolymerisation process carried out in a cyclohexane solution is schematically represented in FIG. 1.

With reference to FIG. 1, a stirred tank reactor 10 contains cyclohexane solvent, ethylene and propylene monomers, a catalyst system and other possible ingredients, as is known in the field. The polymerisation process is preferably carried out at a pressure of from 5 to 100 bar, and at a temperature of from 40 to 300° C.

The catalysts used in the polymerisation process are the product obtained by contacting compounds of transition metals belonging to Groups 4-10 of the Periodic Table of the Elements (New Notation) and aluminium alkyl compounds and/or alumoxane compounds. Among them, particularly preferred are the heterogeneous Ziegler-Natta catalysts comprising the product obtained by contacting an aluminium alkyl compound, optionally halogenated, with a solid component comprising Ti or V halogenated compound supported on magnesium chloride. Another group of preferred catalysts includes the so called single site catalysts (SSC) product obtained by contacting a transition metal compound (according one of the groups 4-10 mentioned above) containing at least one ancillary ligand different from halogen that remains bonded to the transition metal during polymerization with at least an alumoxane or a another compound able to form an alkyl-metal cation. Among single-site catalysts the preferred classes are represented by metallocenes, chromocenes, constrained geometry catalysts and late-transition metal catalysts all of them being very well known in the art.

A solution of the ethylene-propylene copolymer is discharged via line 12 to a finishing section where the polymer is separated from solvent and unreacted monomers in three successive devolatilisation stages 14, 16, 18. The solid ethylene-propylene copolymer is discharged via conduit 20 from stage 18. A solvent recovery section comprising three stages 22, 24, 26 is provided, with a cyclohexane make-up line 28 at stage 22. The unreacted fraction of the process stream is recovered through distillation and recycled back to the reaction section via recycle line 30. Make-up monomers are fed through line 32 into recycle line 30 to form a feed introduced in reactor 10 via a feed line 34.

Monomers start polymerising only in the presence of a catalyst system. The conversion of the reactants is partial. The reactor operating conditions are selected in such a way that the reacting system is one-phase and with a limited viscosity. The polymer solution has to remain such: neither solid polymer nor gas bubbles must segregate from the liquid phase. There is virtually no cyclohexane consumption, while the monomers consumption corresponds quite well to the production.

The polymer concentration in the reactor plays a key role in process control, but is not a directly measurable variable. According to the invention, a method for controlling the polymerisation process is disclosed, such method being based on an algorithm capable to calculate the polymer concentration from others accessible variables, making thus possible to calculate from such variable not only the reactor production, but also the concentration of all substances that determine the properties of the final product. The method of process control according to the present invention and the algorithm on which the method is based are described below.

The reactor feed 34 is a mixture of monomers and solvent. In reactor 10 only a fraction of the monomers turns into polymer.

The process control method of the invention is based on an algorithm for the resolution of a system of equations which is based on the finding that once the operating conditions of the reactor 10 (i.e. temperature and pressure) and the flow rates of all components in the feed stream 34 have been fixed, all properties of the reactor depend on the variable commonly called extent of reaction $\xi$.

In details, polymer concentration, incorporated monomers, bath composition, solution density, and the flow rates of all components in the discharge streams 12, depend on the extent of reaction which is a variable of paramount importance in the algorithm.

The system of equations basically describes the relationship between the extent of reaction and the reactor density. The system consists of four groups of equations: an equation of state, equations for monomer incorporation, stoichiometric equations and transformation equations. Hereinbelow, the equations of the system and the algorithm for its resolution are described in detail.

The single components of the solution process that included in the equations are indicated with letters: A, B and C denote monomers; S stays for solvent and P for polymer.

The Equation of State is one of the equations of the system. Several equations of state describing accurately enough a polymer solution reacting system to be controlled are available. According to the present invention it is preferred to use the PC-SAFT (Perturbed-Chain Statistical Associating Fluid Theory) equation of state which represents the state of the art. Said equation is able to describe accurately volumetric and thermal properties, as well as phase equilibria, of systems with different molecules, small and large, polymers included. This applies especially for the liquid phase and in the region of the critical point. The PC-SAFT equation of state has quite a complex form, but embodies only three unary parameters and one binary parameter.

The equation has a solid theoretical base. In fact, the binary interaction parameters do not generally depart much from zero, the default value, or vice versa, setting them to zero, a good accuracy is already obtained.

It is also possible to use the equation with polymers having a broad molecular weight distribution. For this purpose, a suitable mixture of pseudocomponents equal to the reference polymer but with different molecular weight is to be considered.

An extension of the equation of state to copolymers is implemented and available in the package Polymer Plus of the process simulator Aspen.

The expression of the PC-SAFT equation of state and the unary parameters of conventional compounds can be found in Gross, J.; Sadowski, G. (2001). Perturbed-Chain SAFT: An Equation of State Based on a Perturbation Theory for Chain Molecules. *Ind. Eng. Chem. Res.*, 40, 1244-1260. Unary parameters of polymer segments are listed in Gross, J.; Sadowski, G. (2002), Modeling Polymer Systems Using the Perturbed-Chain Statistical Associating Fluid Theory Equation of State, *Ind. Eng. Chem. Res.*, 41, 1084-1093; and Kouskoumvekaki, I. A.; von Solms, N; Lindvig, T.; Michelsen, M. L.; Kontogeorgis, G. M. (2004), Novel Method for Estimating Pure-Component Parameters for Polymers: Application to the PC-SAFT Equation of State, *Ind. Eng. Chem. Res.*, 43, 2830-2838. The latter source is the preferred one according to the present invention.

As most equations of state are, also the PC-SAFT one is explicit in the pressure variable:

$$P=EOS(T,\rho,z,X)$$

This means that, for a homogeneous polymer system, pressure P depends on temperature T, density $\rho$, composition of system z and composition of the polymer X.

If the system comprised several polymers, the composition of all of them should be reported in the argument list of the EOS function.

z and X are both vectors of molar fractions, but the former refers to the components of the system, polymer included, while the latter refers to the monomers incorporated into the polymer.

The algorithm uses one inverse function of the equation of state:

$$\rho = EOS^{-1}(T,P,z,X)$$

As the reaction system concerned is always one-phase, the isotherms are strictly increasing and this condition makes the inversion calculation always possible. In the iterative procedure for the inversion, the pressure function was approximated with parabolas in order to have a faster convergence.

Both the PC-SAFT equation of state and its inverse function were implemented, according to know procedures, in Visual Basic for Applications.

Equations for Monomer Incorporation

These equations describe the term X present in the Equation of state. In the open literature one various equations are available to describe the relative incorporation of the monomers into the polymer. A reference is for example contained in Ham, G. E. (1964). Copolymerization, High Polymer Series, Vol. XVIII, Interscience, New York.

The simplest model to describe bipolymerization is the linear law:

$$W = RR \cdot w$$

In this formula W and w are the ratios of the molar concentrations of the two monomers, A and B, in the polymer and in the bath respectively:

$$W = \frac{X_A}{X_B} \text{ and } w = \frac{x_A}{x_B}.$$

Capital letters refer to the polymer, small ones to the bath. The proportionality constant RR is called reactivity ratio.

However, in polymerization baths the concentration of reactants can vary over a broad range the proportional law does not hold any more. In this case, it is preferred to apply according to the present invention the following two-parameter equation of Lewis and Mayo:

$$W = w \cdot \frac{r_{AB} \cdot w + 1}{w + r_{BA}}$$

which has a solid theoretical base: it can be reckoned through either statistics or kinetics. The two parameters $r_{AB}$ and $r_{BA}$ are still called reactivity ratios and have a well defined meaning:

$$r_{AB} + \frac{k_{AA}}{k_{AB}}$$

and $k_{AB}$ and $k_{AA}$ are the kinetic constants of the step reactions which are the insertion of, respectively, a segment B and a segment A on an end segment A of the growing polymer chain.

The Lewis-Mayo equation becomes equivalent to the proportional law when $$r_{AB} = RR \text{ and } r_{BA} = 1/RR.$$

Once the variable W has been determined either with the linear law or with the Lewis-Mayo equation, one can eventually access to the molar fractions of the monomers incorporated into the bipolymer, solving the system of equations $$\begin{cases} W = \dfrac{X_A}{X_B} \\ X_A + X_B = 1 \end{cases}$$

with respect to the unknown variables $X_A$ and $X_B$.

The solution of the system is:

$$\begin{cases} X_A = \dfrac{W}{1+W} \\ X_B = \dfrac{1}{1+W} \end{cases}$$

Figure 2:
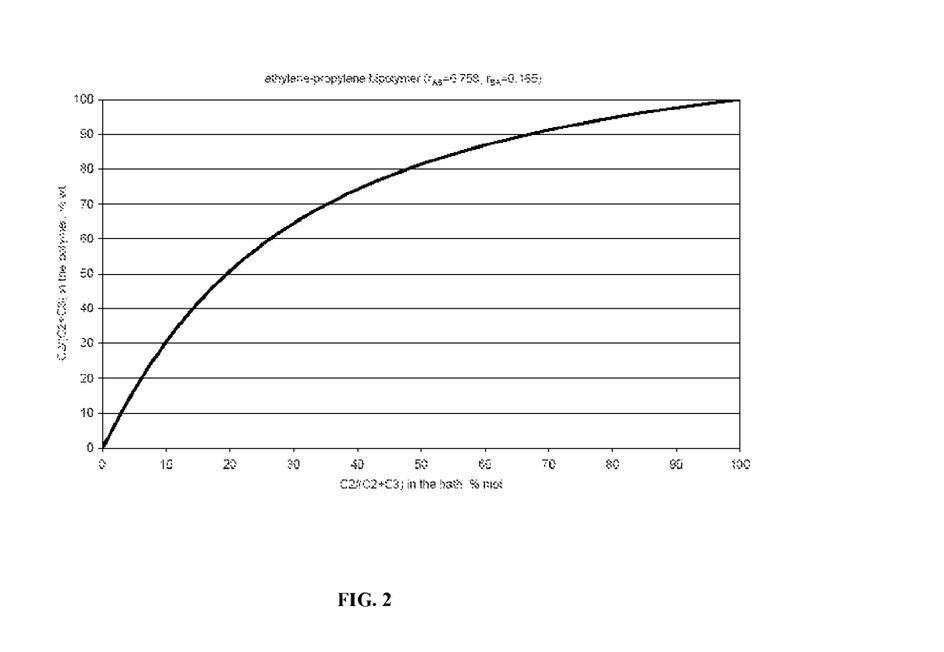
FIG. 2 illustrates application of the Lewis-Mayo equation for the bipolymerization of ethylene (A) and propylene (B).

As an example, a chart has been drawn in FIG. 2 applying the Lewis-Mayo equation for the bipolymerization of ethylene (A) and propylene (B). The used couple of reactivity ratios were estimated from bench scale tests for a Ziegler-Natta catalyst: $r_{AB} = 6.785$ and $r_{BA} = 0.185$.

Terpolymerization is more complex to describe, but the Lewis-Mayo approach can be convincingly and consistently extended to this case. Eventually one gets the following system of equations:

$$\begin{cases} X_A : X_B : X_C = \\ x_A \cdot \left( \dfrac{x_A}{r_{CA} \cdot r_{BA}} + \dfrac{x_B}{r_{BA} \cdot r_{CB}} + \dfrac{x_C}{r_{CA} \cdot r_{BC}} \right) \cdot \left( x_A + \dfrac{x_B}{r_{AB}} + \dfrac{x_C}{r_{AC}} \right) : \\ x_B \cdot \left( \dfrac{x_A}{r_{AB} \cdot r_{CA}} + \dfrac{x_B}{r_{AB} \cdot r_{CB}} + \dfrac{x_C}{r_{CB} \cdot r_{AC}} \right) \cdot \left( \dfrac{x_A}{r_{BA}} + x_B + \dfrac{x_C}{r_{BC}} \right) : \\ x_C \cdot \left( \dfrac{x_A}{r_{AC} \cdot r_{BA}} + \dfrac{x_B}{r_{BC} \cdot r_{AB}} + \dfrac{x_C}{r_{AC} \cdot r_{BC}} \right) \cdot \left( \dfrac{x_A}{r_{CA}} + \dfrac{x_B}{r_{CB}} + x_C \right) \\ X_A + X_B + X_C = 1 \end{cases}$$

It must be solved with respect to the unknown variables $X_A$, $X_B$ and $X_C$.

Six reactivity ratios appear as constants in the equation system, namely: $r_{AB}$, $r_{BA}$, $r_{AC}$, $r_{CA}$, $r_{BC}$, $r_{CB}$. They are related to the three bipolymerization couples: A and B, B and C, A and C. The whole set of reactivity ratios is indicated shortly as the vector r.

If the three terms on the right side of the proportional relationship are respectively named $G_A$, $G_B$ and $G_C$ and considered as components of the vector G, the solution of the system can be written as:

$$X = \frac{G}{Q}$$

where:

$$Q = \sum_{i \in I} G_i$$

and $I \in \{A, B, C\}$.

A routine was implemented in Visual Basic for Applications for the calculation of the composition of the polymer being produced.

In detail, given the concentrations of the monomers in the bath and the reactivity ratios, the routine calculates the composition of the polymer.

The approach followed was the one of Lewis-Mayo for terpolymerization because it is the most general.

It is useful to summarize the calculation performed by the routine with the function $$X = INC(x, r)$$

where:
X is the vector of the molar fractions of the monomers in the polymer,
x is the vector of the molar fractions of the monomers in the bath,
r is the vector of reactivity ratios.

Stoichiometric Equations

The stoichiometric equations state what the monomeric composition of the bath is as the polymerization advances. They can be written in vectorial form:

$$x = \frac{x^0 - X \cdot \xi}{1 - \xi}$$

In the stoichiometric equations appears the variable extent of reaction $\xi$, which plays a key role in the algorithm.

The extent of reaction $\xi$ is the molar concentration in the feed of the polymerizing segments, i.e. the ratio of the moles of polymerized monomers to the moles of solvent and monomers already polymerized and still free in the bath.

In addition to the extent of reaction, there is other new notation in the stoichiometric equations. The vector x lists the molar fractions of the monomers in the bath and the suffix 0 refers to the feed.

One recognizes now that $\xi$ can vary from 0 (no polymerization) up to $x_A^0 + x_B^0 + x_C^0$ (total consumption of the monomers).

It may turn out helpful to introduce also the specific extent of reaction:

$$\psi = \xi \cdot (x_A^0 + x_B^0 + x_C^0)$$

$\Psi$ has the advantage that it varies between 0 and 1.

The stoichiometric equations are closely linked together with the monomer incorporation equations and must be solved together.

Substituting the former into the latter, a new vectorial relationship is obtained:

$$X = INC\left(\frac{x^0 - X \cdot \xi}{1 - \xi}, r\right)$$

This is a parametric system of as many equations as the monomers are, the unknown variables being the components of the vector X, i.e. the molar fractions of the incorporated monomers into the polymer.

Vectors $x^0$ and r are known variables and the extent of reaction $\xi$ is the parameter.

A special routine was implemented in Visual Basic for Applications to solve it. The technique applied for the resolution of the non-linear system was the iterative Newton-Raphson method.

The solution of the vectorial equation may be considered as a function. It is now available and has the form:

$$X = CORE(\xi, x^0, r)$$

Important results can now be drawn. Once the feed and the reactivity ratios are specified, the composition of the polymer is a function of the extent of reaction only.

Of course the same holds for the monomer concentration in the bath. In fact, the new function can be usefully substituted into the stoichiometric equations:

$$x = \frac{x^0 - CORE(\xi, x^0, r) \cdot \xi}{1 - \xi}$$

It may be instructive to examine an example.

By way of example, FIG. 3 shows a chart of the functions $x_A(\xi)$, $x_B(\xi)$, $x_A(\xi)$ built when $x_A^0 = 0.2$, $x_B^0 = 0.4$, $r_{AB} = 6.785$ and $r_{BA} = 0.185$. The function $X_B(\xi)$ has not been drawn because $X_B(\xi) = 1 - X_A(\xi)$.

In the example A is ethylene and B is propylene.

It is confirmed that ethylene, even if less concentrated, is more reactive that propylene is. Due to the different reactivity of the two monomers, the propylene concentration in the bath, when increasing the extent of reaction, first rises, then diminishes, showing a maximum, not bordered.

If the feed is not adjusted, a runaway produces a polymer richer in propylene, i.e. the incorporated ethylene diminishes.

The monomers simultaneously run out at the end, when the specific extent of reaction reaches unity.

Transformation Equations

These equations, which are the last group of the system, deal with two problems.

At first instance they allow to transform the intensive variables that have been considered so far, into inputs and outputs of the algorithm having an extensive nature. In details, the algorithm receives and produces flow rates of all components in the feed and discharge streams.

As a second aspect, the transformation equations convert in equivalent terms the information of the system composition which is used in all equations but in different forms.

Monomer incorporation equations and stoichiometric equations link together the monomer composition vectors x and X referring to bath and polymer respectively, while the equation of state counts also the system composition vector z among its arguments.

If f is the molar flow vector of the feed, then the composition of the feed can be written as:

$$x_i^0 = \frac{f_i}{\sum_{j \in J} f_j} \forall i \in I = \{A, B, C\}$$

Even if simple, it is useful to write this formula in a form that underlines the dependence of the variables:

$$x^0 = FEED(f)$$

If N is the molar flow vector of the incorporated monomers and n is the molar flow vector of all system components (monomers, solvent and polymer), then one can reckon the following mass balance equations:

$$N = \sum_{j \in J} f_j \cdot \xi \cdot X \text{ with } J = \{A, B, C, S\}$$

$$n_i = f_i - N_i \forall i \in I$$

$$n_S = f_S$$

$$n_P = \frac{N \cdot MW}{PMW}$$

where MW is the vector of the molecular weights of the monomers and PMW is the molecular weight of the polymer.

It is well known that the molecular weight of a polymer has a negligible effect on the volume properties of the polymer system it is part of. The constant PMW can be then selected freely, provided it is higher than, for example, 100000.

The dependence of the involved variables is therefore summarized:

$$n = \text{TRANS}(\xi, X, f, MW, PMW)$$

If z is the molar flow vector of the discharge, then the composition of the discharge can be written as:

$$z = \frac{n}{\sum_{k \in K} n_k} \text{ with } K = \{A, B, C, S, P\}$$

Even if simple, it is useful to write this formula in a form that underlines the dependence of the variables:

$$z = \text{DISCHARGE}(n)$$

Algorithm

All elements are now available to write down the system of equations describing the reacting system.

$$\begin{cases} P = EOS(T, \rho, z, X) \\ X = INC(x, r) \\ x = \frac{x^0 - X \cdot \xi}{1 - \xi} \\ x^0 = \text{FEED}(f) \\ n = \text{TRANS}(\xi, X, f^0, MW, PMW) \\ z = \text{DISCHARGE}(n). \end{cases}$$

The equations of the system are both scalar and vectorial. Several variables are involved in the system.

Pressure P, temperature T and density $\rho$ of the polymer solution are measured. This applies also for the vector f listing the feed flow rates of all components.

The reactivity ratios collected in vector r, the molecular weights of the monomers in vector MW and the polymer molecular weight PMW are known a priori.

The system can be then solved with respect to the unknown variables $x^0$, x, X, $\xi$, n, z.

In details, the two vectors n and X completely describe the discharge stream of the reactor.

The presented system of equations may be theoretically solved as such. Nevertheless, the best practice in numerical computation recommends it be split into smaller ones, whenever possible. This rule typically reduces the computational time.

It is shown here the algorithm to solve the system of equations.

It is convenient to write the equations of the system in a different order and in other forms, all of them already presented.

$$\begin{cases} x^0 = \text{FEED}(f) \\ X = \text{CORE}(\xi, x^0, r) \\ n = \text{TRANS}(\xi, X, f, MW, PMW) \\ z = \text{DISCHARGE}(n) \\ \rho = EOS^{-1}(T, P, z, X) \\ x = \frac{x^0 - X \cdot \xi}{1 - \xi} \end{cases}$$

The first five equations are functions and can be substituted, one into the following so that the new following function can be obtained:

$$\rho = \text{MAIN}(T, P, f, \xi, MW, PMW, r),$$

all arguments of which are known, except the extent of reaction $\xi$.

The behavior of the new function can be guessed.

When the extent of reaction increases, light components, such as the monomers, disappear and a heavy component, such as the polymer, appears. The composition change causes the polymer solution to get thicker.

The function MAIN is thus strictly increasing and can undergo inversion with respect to the extent of reaction:

$$\xi = \text{MAIN}^{-1}(T, P, f, \rho, MW, PMW, r)$$

Routines can be implemented in Visual Basic for Applications for the calculation of the two functions.

The calculation of the function MAIN is obtained just through composition of already available functions; The calculation of the inverse function $\text{MAIN}^{-1}$ is obtained via the applied computational technique based one the bisection method.

The equation system can be eventually written in the last form.

$$\begin{cases} \xi = MAIN^{-1}(T, P, f, \rho, MW, PMW, r) \\ x^0 = \text{FEED}(f) \\ X = \text{CORE}(\xi, x^0, r) \\ n = \text{TRANS}(\xi, X, f, MW, PMW) \\ z = \text{DISCHARGE}(n) \\ x = \frac{x^0 - X \cdot \xi}{1 - \xi} \end{cases}$$

The form is such that all unknown variables can be calculated, one after the other, just through direct calculation and substitutions.

In all equations presented, mole basis have been used for flows and fractions. Of course it may be easily changed into mass basis.

Nomenclature f: feed molar flow, kmol/s
f: vector of feed molar flows (index base J)
G: term of the terpolymerization proportion, –
G: vector of the terms in the terpolymerization proportion (index base I)
k: kinetic constant
MW: molecular weight of a monomer, kg/kmol
MW: vector of the molecular weights of the monomers (index base I)
n: molar flow in the system, kmol/s
n: vector of molar flows in the system (index base K)
N: molar flow of polymerized monomer, kmol/s N: vector of molar flow of polymerized monomers (index base I)
P: pressure, Pa
PMW: polymer molecular weight, kg/kmol
Q: parameter, -
r: reactivity ratio in the Lewis-Mayo equation, -
r: vector of reactivity ratios (index base: AB, BA, AC, CA, BC, CB)
RR: reactivity ratio in the proportional law, -
T: temperature, K
w: molar ratio of monomer A to monomer B in the bath, kmol/kmol
W: molar ratio of monomer A to monomer B in the polymer, kmol/kmol
X: molar fraction in the polymer, kmol/kmol
X: vector of molar fractions in the polymer (index base I)
x: molar fraction in the bath, kmol/kmol
x: vector of molar fractions in the bath (index base I)
z: molar fraction in the system, kmol/kmol
z: vector of molar fractions in the system (index base K)
Greek Letters
$\rho$: density kmol/m$^3$
$\xi$: extent of reaction, kmol/kmol
$\Psi$: specific extent of reaction, -
Subscript
A: referring to monomer A
B: referring to monomer B
C: referring to monomer C
i: index for a monomer
j: index for a component of the feed
k: index for a component of the system
S: referring to the solvent
P: referring to the polymer
Superscript
0: referring to the feed
−1: inverse function
Set
I={A, B, C}
J={A, B, C, S}
K={A, B, C, S, P}
Function
CORE
DISCHARGE
EOS
FEED
INC
TRANS
Implementation of the Control System A chemical plant is typically controlled through a network of processors called Distributed Control System (DCS). The DCS exchanges information with the field by means of input and output modules. Input modules receive information from input instruments (sensors of temperature, pressure, level, etc.) and output modules transmit information to output instrumentation (actuators of valves). Proprietary protocols are used for communication among processors and between processors and modules.

In a process, a variable may be controlled through manipulation of another proper variable by means of a controller. The system of the controlled variable, the manipulated variables and the controller is called control loop. DCS processors may manage several controllers. Operators may access process parameters managed by the DCS trough workstations. In the DCS environment, a tag is given to all process parameters. The DCS may have also an Application Processing Platform to exchange information with other systems for data elaboration.

Visual Basic (VB) is a programming language. Programs can be coded in Visual Basic as executables files.

Microsoft Office Excel (or shortly Excel) is a spreadsheet application. It features calculation, graphing tools, pivot tables and a macro programming language called VBA (Visual Basic for Applications), a derivative of VB. An Excel file appears to the user as a workbook consisting of several worksheets. Both products are written and distributed by Microsoft for the operating system Microsoft Windows.

The algorithm used in the method of the invention was implemented in an Excel file. The routines and functions described were coded as macros in VBA and properly called from the cells of one worksheet. In another worksheet of the Excel file, tags and values of operating and predicted parameters were listed. The Excel file may run stand-alone. As soon as one inputs the values of the operating parameters, upon calculation, the predicted variables are adjourned.

A VB executable file was prepared for the data exchange between the plant DCS and the Excel file and the calculation of the Excel file.

The communication of real-time data is based on the standard OPC, which stands for OLE for Process Control. In turns OLE means Object-Linking and Embedding.

In details, the VB executable file performs the following actions:
1. To read the tags of the operating and predicted parameters from the Excel file.
2. To fetch the values of the operating parameters in the DCS.
3. To put the values of the operating parameters in the proper cells of the Excel file.
4. To calculate the workbook with all VBA macros.
5. To fetch the values of the predicted parameters in the proper cells of the Excel file.
6. To store the values of the predicted parameters in the proper location of the DCS.

Example

The example refers to the production of an ethylene/propylene copolymer with 12% wt of ethylene.

The reactivity ratios for the ZN catalyst employed were the following: $r_{AB}=0.758$, $r_{BA}=0.185$.

A recipe was prepared with predicted values for the chemical composition of the bath corresponding to the conditions required to obtain a desired product. The recipe is shown in Table 1 below, where C2− and C3− stand for ethylene and propylene, respectively:

TABLE 1

Recipe for ethylene/propylene copolymer in cyclohexane solution

| PRODUCT | |
| --- | --- |
| C$_2^-$ bound in copolymer | 12 wt % |
| Melt Index L (230° C.; 2.16 kg; 3.04 kg/cm2) | 1.5 dg/min |
| Intrinsic viscosity | 2.2 dg/min |
| PROCESS CONDITIONS | |
| Catalyst system | Ziegler/Natta + aluminum trialkyl |
| Temperature | 100° C. |
| Pressure | 35 barg |
| Solvent | Cyclohexane |
| Density of the solution | 625 kg/m$^3$ |
| Polymer concentration | 20 wt % |
| Monomer concentration | 35 wt % |
| Flow rate of C$_2^-$ discharged | 0.83 kg/h |
| Flow rate of C$_3^-$ discharged | 34 kg/h |

TABLE 1-continued

| Recipe for ethylene/propylene copolymer in cyclohexane solution | |
|---|---|
| Flow rate of Cyclohexane discharged | 65 kg/h |
| Polymer production | 25 kg/h |

The recipe shows the target values for the most meaningful operating parameters, such as flow rate of $C_2^=$, $C_3^=$, cyclohexane and polymer discharged from the reactor. These target values are to be maintained during operation of the process to produce a copolymer with the desired properties and characteristics.

Once the process was started up and a steady run of the reactor was established, the algorithm described above performed a calculation of predicted operating parameters using few measured parameters. In a run of the process to make a copolymer according to the recipe above, the following operating parameters were measured and the following values were detected:

| | |
|---|---|
| (i) temperature (T) of the polymerisation reactor: | 100° C. |
| (ii) pressure (P) of the polymerisation reactor: | 35 bar |
| (iii) density (ρ) of the solution within the polymerisation reactor: | 626 kg/m3 |
| (iv) flow rate of the recycle stream | 87 kg/h |
| (v) concentration of ethylene in the recycle stream | 0% wt |
| (v) concentration of propylene in the recycle stream | 25% wt |
| (vi) concentration of cyclohexane in the recycle stream | 75% wt |
| (vii) flow rate of fresh C2= fed to the polymerisation reactor | 2.5 kg/h |
| (vii) flow rate of fresh C3= fed to the polymerisation reactor | 35 kg/h |

Density, concentration of monomers in the recycle stream and flow rates were measured with Coriolis Mass Flowmeters "OPTIMASS" manufactured by Krohne Ltd.

The calculations performed by the algorithm gave the values reported below for the predicted parameters:

| | |
|---|---|
| (i) flow rate of unreacted C2= | 0.53 kg/h |
| (i) flow rate of unreacted C3= | 34 kg/h |
| (ii) flow rate of discharged solvent | 65 kg/h |
| (iii) flow rate of discharged polymer | 25 kg/h |

The predicted values showed a deviation from the target values. In particular, the predicted value for the flow rate of unreacted C2= was 0.53 kg/h, namely it was lower than the target value of 0.83 kg/h.

The monitoring team in a control room detected this deviation and performed a change in the feed to compensate for such deviation. In this case the change was the increase of the flow rate of the fresh C2= in such a way that the predicted flow rate of the unreacted C2= reached the target value.

The example above shows that the method for controlling a solution polymerisation process according to the invention allows to produce a polymer with desired properties and characteristics, and to maintain stable such characteristics during the entire run of the plant, by measuring and/or detecting a few parameters that are easy to measure or detect. In particular, when steady operation is reached, the method of the invention does not require to carry out any chemical analysis of the polymer produced or of the bath or of both, and does not require that samples of the polymer or of the bath or of both are withdrawn from the reactor to undergo any chemical analysis or other physical investigation, either online or offline. In particular, the density of the solution is measured by means of commercial instruments or devices, as described above.

The invention claimed is:

1. A method for controlling a solution process for the catalytic polymerisation of olefins in which one or more monomers are polymerised in a reactor to form a (co)polymer which is soluble in a solvent present in the reactor, said process comprising recycling unreacted monomers and solvent and feeding fresh monomers and solvent in said reactor, the method comprising:
   a) measuring the values of a set of operating parameters, including:
      (i) temperature (T) of the polymerisation reactor;
      (ii) pressure (P) of the polymerisation reactor;
      (iii) density (ρ) of the solution within the polymerisation reactor;
      (iv) flow rate of the recycle stream;
      (v) concentration of monomers in the recycle stream;
      (vi) concentration of solvent in the recycle stream;
      (vii) flow rate of the fresh monomers fed to the polymerisation reactor;
   b) calculating a set of predicted parameters related to the stream discharged from the polymerisation reactor using the values of the operating parameters, the predicted parameters comprising:
      (i) flow rate of unreacted monomers;
      (ii) flow rate of discharged solvent;
      (iii) flow rate of discharged polymer;
   c) comparing said values of said predicted parameters to target parameters defined for optimum operation of the process to produce a polymer with desired characteristics and properties;
   d) detecting possible deviations of the value of said predicted parameters from the values of the corresponding target parameters;
   e) optionally adjusting the flow rate of one or more of said monomers freshly fed to said polymerisation reactor, and/or of any other component of the fresh feed or recycle fed to said reactor, and/or adjusting the temperature (T) and/or the pressure (P) of said polymerisation reactor to compensate for said possible deviations;
wherein said calculation of said predicted parameters is carried out by an algorithm performing calculation of the extent of reaction (ξ) as a function of the solution density (ρ) and then calculating the whole composition of the solution, said calculation comprising resolution of a system of equations comprising the equation of state, equations for the relative incorporation of monomers into the (co)polymer, stoichiometric equations and transformation equations.

2. The method according to claim 1, wherein the predicted parameters further comprise the concentration of (co)polymer in the reactor.

3. The method according to claim 1, wherein the predicted parameters further comprise the flow rate of the incorporated monomers.

4. The method according to claim 1, wherein step e) comprises adjusting the flow rate of the catalyst or catalyst component.

5. The method according to claim 1, wherein the resolution of a system of equations comprises the resolution of the equation of state in the PC-SAFT form.

6. The method according to claim 1, wherein the resolution of a system of equations comprises the resolution of the Lewis-Mayo equation.

7. The method according to claim 1, wherein the monomers polymerised in said reactors comprise ethylene and propylene.

8. The method according to claim 1, wherein the concentration of monomers in the recycle stream measured at step a)(v) of said method is the concentration of ethylene and propylene.

9. The method according to claim 1, wherein the flow rate of unreacted monomers calculated at step b)(i) of said method is the flow rate of unreacted ethylene and propylene.

10. The method according to claim 1, wherein the information related to said operating parameters measured at step a) is processed via a control system which generates output information transmitted to a unit performing a calculation of said predicted parameters according to said algorithm by means of a computer program.

11. The method according to claim 10, wherein the control system is a Distributed Control System.

12. The method according to claim 10, wherein the language of said computer program is Visual Basic.

\* \* \* \* \*